United States Patent
Kosuri et al.

(10) Patent No.: US 10,808,767 B2
(45) Date of Patent: Oct. 20, 2020

(54) MOUNTING SEGMENTS AND A WIND TURBINE WITH MOUNTING SEGMENTS

(71) Applicants: Srinivas Ratna Kosuri, Brande (DK); Martin Moeskjaer, Herning (DK); C. Gangadhara Reddy, Bangalore (IN)

(72) Inventors: Srinivas Ratna Kosuri, Brande (DK); Martin Moeskjaer, Herning (DK); C. Gangadhara Reddy, Bangalore (IN)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 515 days.

(21) Appl. No.: 15/699,228

(22) Filed: Sep. 8, 2017

(65) Prior Publication Data

US 2018/0087578 A1    Mar. 29, 2018

(30) Foreign Application Priority Data

Sep. 23, 2016  (EP) ..................... 16190378

(51) Int. Cl.
*F16D 1/076*   (2006.01)
*F03D 80/00*   (2016.01)
(Continued)

(52) U.S. Cl.
CPC ........... *F16D 1/076* (2013.01); *F03D 1/0691* (2013.01); *F03D 13/10* (2016.05); *F03D 15/00* (2016.05);
(Continued)

(58) Field of Classification Search
CPC .............. F05B 2240/21; F05B 2240/60; F05B 2240/61; F05B 2230/80; F03D 1/06; F03D 1/0691; F03D 80/50; F16B 2200/506

See application file for complete search history.

(56) References Cited

U.S. PATENT DOCUMENTS

| 2,282,641 | A | * | 5/1942 | Corey | ....................... E03B 9/02 |
| | | | | | 285/2 |
| 4,028,909 | A | * | 6/1977 | Jancic | ....................... F16D 1/02 |
| | | | | | 464/32 |

(Continued)

FOREIGN PATENT DOCUMENTS

| CN | 201963465 U | 9/2011 |
| CN | 202768285 U | 3/2013 |

(Continued)

OTHER PUBLICATIONS

Chinese Office Action for Chinese Application No. 201710867712.7 dated Jan. 9, 2019.

(Continued)

*Primary Examiner* — Michael P Ferguson
(74) *Attorney, Agent, or Firm* — Lempia Summerfield Katz LLC

(57) ABSTRACT

The disclosure relates to a main shaft of a wind turbine with mounting segments. The main shaft includes a shaft portion and a disc portion. The disc portion includes a coupling surface, a hollow portion, and an alignment portion. The alignment portion is characterized by one or more mounting segments coupled with the alignment portion. The mounting segments are configured to align a component of the wind turbine with the central axis of the main shaft. Further, the one or more mounting segments are coupled to the alignment portion using at least one fastening device. The mounting segments have a thickness 't' that may be constant or varied based on the component 32 of the wind turbine coupled to the main shaft.

15 Claims, 8 Drawing Sheets

(51) Int. Cl.
*F03D 15/00* (2016.01)
*F03D 13/10* (2016.01)
*F03D 1/06* (2006.01)
*F16C 3/02* (2006.01)

(52) U.S. Cl.
CPC ............... *F03D 80/00* (2016.05); *F16C 3/02* (2013.01); *F05B 2240/21* (2013.01); *F05B 2240/60* (2013.01); *F05B 2240/90* (2013.01); *F16C 2360/31* (2013.01); *Y02E 10/721* (2013.01); *Y02E 10/722* (2013.01)

(56) References Cited

U.S. PATENT DOCUMENTS

| | | | | |
|---|---|---|---|---|
| 7,721,434 | B2* | 5/2010 | Weaver | F03D 80/50 |
| | | | | 188/68 |
| 8,246,312 | B2* | 8/2012 | Schubert | F03D 1/0691 |
| | | | | 416/244 R |
| 10,024,298 | B2* | 7/2018 | Kratmann | F03D 1/0658 |
| 2011/0250077 | A1* | 10/2011 | Pedersen | F03D 80/70 |
| | | | | 416/244 R |
| 2013/0195666 | A1 | 8/2013 | Minadeo et al. | |
| 2013/0302169 | A1* | 11/2013 | Hennes | F03B 13/264 |
| | | | | 416/170 R |
| 2015/0096174 | A1 | 4/2015 | Lohan et al. | |
| 2015/0107576 | A1 | 4/2015 | Jeong | |

FOREIGN PATENT DOCUMENTS

| | | | | |
|---|---|---|---|---|
| CN | 202914930 | U | | 5/2013 |
| CN | 204283755 | U | | 4/2015 |
| CN | 204299802 | U | | 4/2015 |
| CN | 105317633 | A | | 2/2016 |
| DE | 10 2010 010 283 | | * 9/2011 | ............... F03D 1/09 |
| DE | 102015210278 | A1 | | 12/2015 |
| KR | 20150045195 | A | | 4/2015 |
| KR | 20150045795 | A | | 4/2015 |
| WO | WO2014006074 | A1 | | 1/2014 |

OTHER PUBLICATIONS

European Grant Decision for European Application No. 16 190 378.6-1007, dated Mar. 1, 2019.
"Mechanical Parts Failure Analysis and Examples" 2014; ISBN: 978-7-5603-4989-3, with abstract. pp. 1-5.
Chinese Office Action for Chinese Application No. 201710867712.7 dated Jul. 9, 2019.

* cited by examiner (PRIOR ART)

MOUNTING SEGMENTS AND A WIND TURBINE WITH MOUNTING SEGMENTS

The application claims the benefit of European Patent Application No. EP 16190378.6, filed Sep. 23, 2016, which is hereby incorporated by reference in its entirety.

TECHNICAL FIELD

This disclosure relates to components used in the construction of wind turbine. More specifically, the disclosure relates to components related to a main shaft of the wind turbine for coupling a hub portion to the main shaft.

BACKGROUND

Wind turbines generally need to fasten bulky parts such as hub to the main shaft. The main shaft has to bear significant load and hence there may be considerable amount of stress due to the connection of the hub portion. The main shaft is fabricated from a high strength alloy such as 42CrMo4 (Alloy Steel). The hub portion may be connected to the disc portion of the main shaft using a bolted connection. Due to the connection of the hub portion with the shaft there is a considerable amount of stress concentration in the region. Further, a guiding device is employed in the disc portion of the main shaft in order to guide the portion of the wind turbine being attached to the main shaft. The guiding device is commonly referred to as nose portion.

The nose portion may be a protrusion from the disc portion of the main shaft. The nose portion aids in guiding the portion of the wind turbine coupled to the shaft to the central axis of the main shaft. The nose portion may be fabricated from the same material as the main shaft. Such a construction of the nose portion will not only increase the weight of the main shaft but also elevate the cost of the main shaft.

Therefore, there is a need for a better alternative for the nose portion and the construction thereof. Further, there is also a need for reducing the cost of the main shaft by employing the alternative nose portion. Additionally, the stress concentration near the disc portion of the main shaft needs to be reduced.

SUMMARY AND DESCRIPTION

The scope of the present disclosure is defined solely by the appended claims and is not affected to any degree by the statements within this description. The present embodiments may obviate one or more of the drawbacks or limitations in the related art.

The object of the present disclosure is to provide a novel alternative for the nose portion of the main shaft. The object is achieved by providing a main shaft with one or more mounting segments. The main shaft of a wind turbine may include a shaft portion and a disc portion. The disc portion includes a coupling surface, a hollow portion and an alignment portion. The coupling surface is outermost portion of the disc portion where the coupling portion is configured to receive a component of the wind turbine. The surface of the portion of the wind turbine may have a positive contact with the coupling portion. In an example, the portion of the wind turbine may be a hub portion of the wind turbine. The coupling portion may be provided with one or more coupling devices to secure the portion of the wind turbine with the coupling portion of the disc portion. The hollow portion of the main shaft is the inner most portion of the disc portion of the main shaft. The alignment portion of the disc portion is positioned between the coupling portion and the hollow portion. The alignment portion is characterized by one or more mounting segments coupled with the alignment portion are configured to align a component of the wind turbine with the central axis of the main shaft. The mounting segments are segments of metal coupled along the alignment portion in order to align a portion of the wind turbine being mounted onto the main shaft to the horizontal central axis of the main shaft.

In an advantageous embodiment, the one or more mounting segments are coupled to the alignment portion using at least one fastening devices. The fastening device may include, but not limited to, a bolt, a weld and an adhesive.

In further embodiment, the one or more mounting segments have a thickness 't'. The thickness t is selected so that the component of the wind turbine is aligned with the central axis of the main shaft. The thickness t is selected based on the structure of the portion of the wind turbine to be mounted onto the main shaft. For example, the thickness t of the mounting segments may be more if portion of the component interfacing with the alignment portion is in an elevated plane as compared to the plane of the mounting segments. In an alternate embodiment, each mounting segment of the one or more mounting segments may have a varying thickness. The thickness of each mounting segment of the mounting segments may be varied based on the component of the wind turbine being attached to the main shaft. Th Further, at least one end of the mounting segments is tapered. For example, the end of the mounting segment contacting the component of the wind turbine may be tapered to reduce stress concentration.

In another embodiment, the one or more mounting segments have a curved quadrilateral structure. Further, the mounting segments have a degree of curvature θ, which varies according to the position of the alignment segment. In some other embodiments, the mounting segment may have structure such as, but not limited to, a sinuous structure and a rhomboid structure.

In yet another embodiment, the one or more mounting segments includes a first mounting segment having a length L1 and a second mounting segment having a length L2, wherein the length L1 is greater than L2. In some other embodiments, the length L1 and L2 of the first and the second mounting segments may be equal.

In a further embodiment, the first mounting segment and the second mounting segment are placed diagonally opposite to each other. In an exemplary embodiment, the first mounting segment may be placed at an angle to the second mounting segment. In a further embodiment, the first and second mounting segments may be affixed adjacent to one another. The placement of the one or more mounting segments may be chosen such that the stress concentration at the disc portion of the main shaft is reduced.

In a further advantageous embodiment, the material used in fabricating the mounting segments is structural steel. For example, the material used for fabricating the mounting segments may be less expensive than that of the material used for fabricating the main shaft.

In an embodiment, a portion of the one or more mounting segments is configured to make a positive contact with the component of the wind turbine. The mounting segments have a thickness t which aids in guiding a component wind turbine to the center of the main shaft. In the process, the component of the wind turbine may make a permanent contact with at least a portion of the mounting segments.

In another embodiment, the at least one component of the wind turbine is a hub portion of the wind turbine. In other embodiments, the mounting segments may be used in aligning component of the wind turbine other than the hub portion.

Further, the coupling surface includes a plurality of coupling devices. The coupling surface includes coupling device such as, but not limited to, threaded portions to bolt the component of the wind turbine.

BRIEF DESCRIPTION OF THE DRAWINGS

The above mentioned and other features of the disclosure will now be addressed with reference to the accompanying drawings. The illustrated embodiments are intended to illustrate, but not limit the disclosure.

The present disclosure is further described hereinafter with reference to illustrated embodiments shown in the accompanying drawings, in which.

Figure 1:
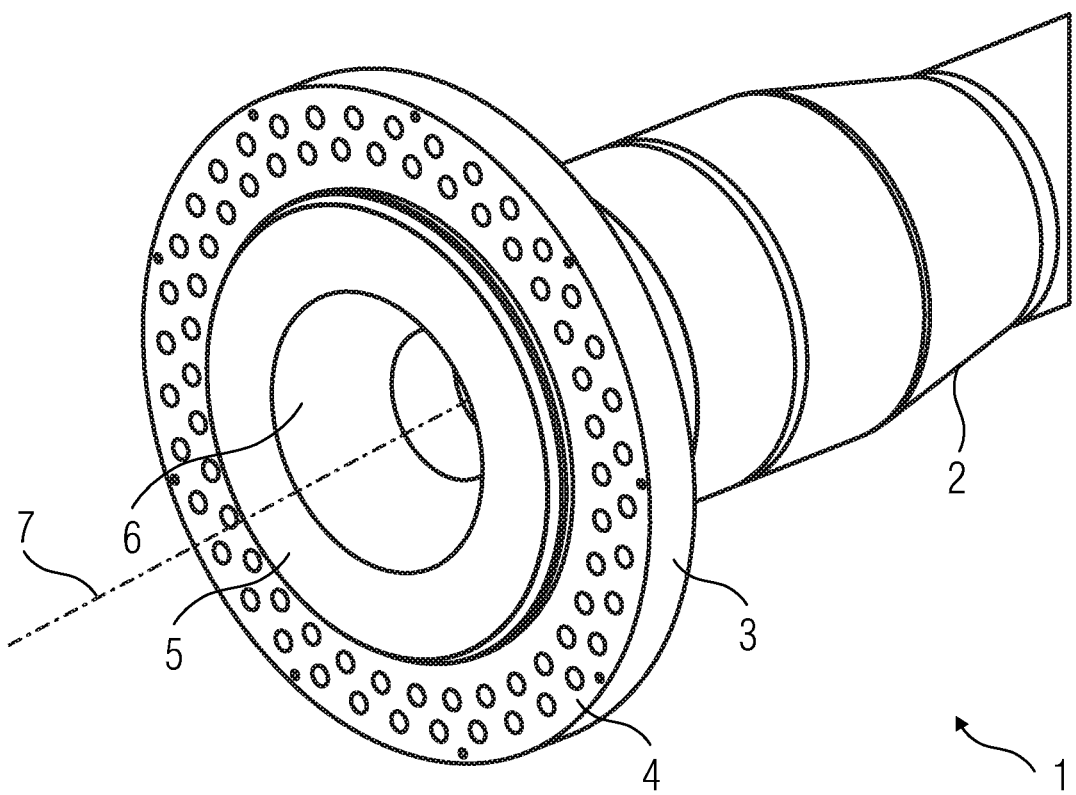
FIG. 1 illustrates a perspective view of a nose portion of the main shaft in accordance with prior art.

Various embodiments are described with reference to the drawings, wherein like reference numerals are used to refer like segments throughout. In the following description, for the purpose of explanation, numerous specific details are set forth in order to provide thorough understanding of one or more embodiments. It may be evident that such embodiments may be practiced without these specific details.

DETAILED DESCRIPTION

FIG. 1 illustrates a perspective view of a nose portion 5 of the main shaft 1 in accordance with prior art. As depicted in FIG. 1, the main shaft 1 includes a shaft portion 2 and a disc portion 3 where a component of the wind turbine is mounted onto the main shaft 1. The disc portion 3 includes a coupling portion 4, an alignment portion 5 and a hollow portion 6. The coupling portion 4 includes one or more fastening devices disposed on the surface thereof. The component of the wind turbine is coupled to the coupling portion 4 using one or more fastening devices. In this case, the fastening devices may be one or more threaded portions configured to receive bolts to secure the component of the wind turbine onto the coupling portion 4.

The alignment portion 5 is configured in a way to guide the portion of the wind turbine to the central axis of the main shaft 1. The alignment portion 5 is slightly elevated from the surface plane of the disc portion 3. The main purpose of the alignment portion 5 is to guide the portion of the wind turbine to the central axis 7 of the main shaft 1. Further, the alignment portion 5 is a fabricated from the same material as the main shaft 1, which is an expensive alloy, such as a steel alloy. This results in the increased cost of construction of the main shaft 1 as well as an increase in the weight thereof.

Figure 2:
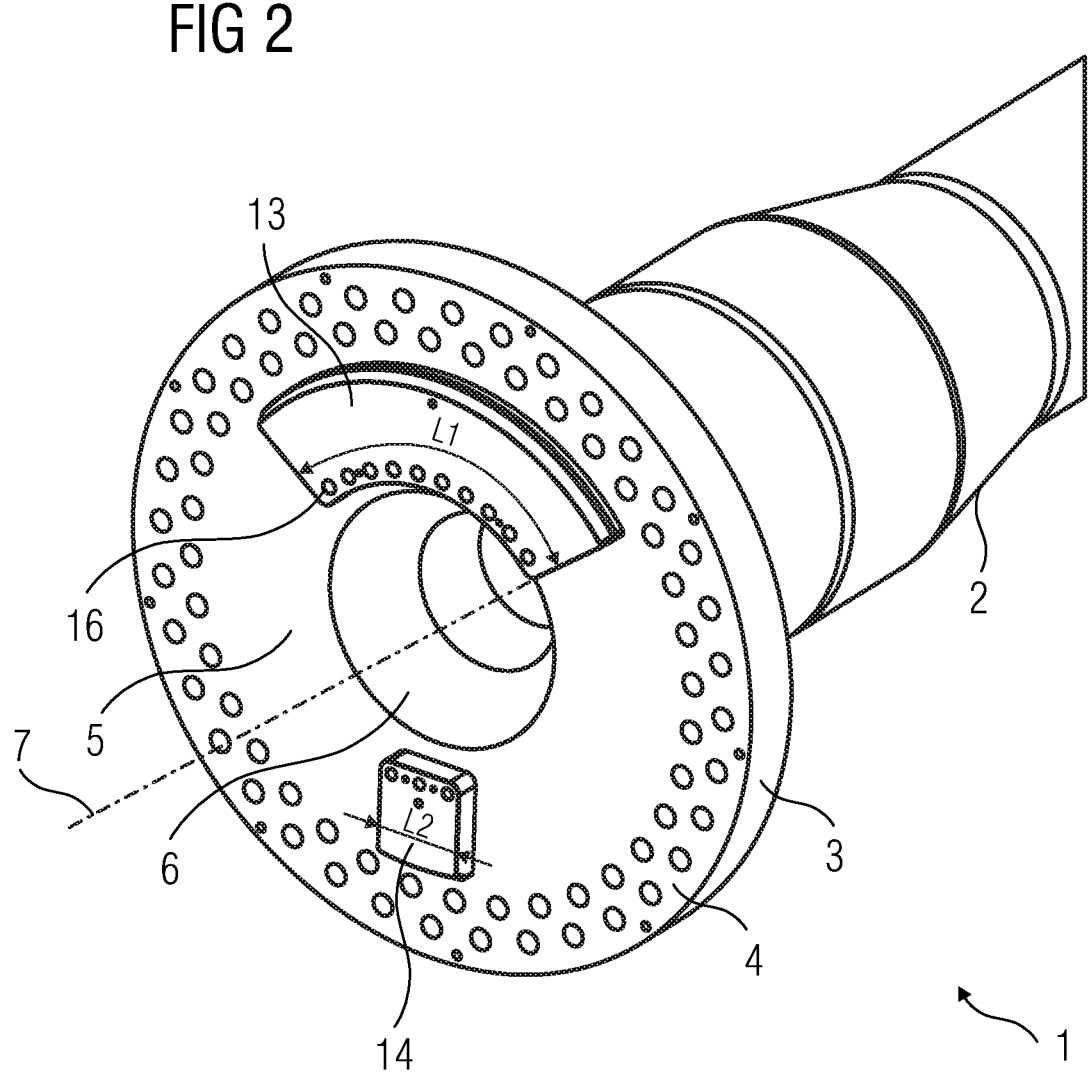
FIG. 2 illustrates a perspective view of the main shaft of a wind turbine with mounting segments, in accordance with an embodiment.

FIG. 2 illustrates a perspective view of the main shaft 1 of a wind turbine with mounting segments, in accordance with an embodiment. The mounting segments, such as mounting segment 13 and mounting segment 14, are coupled to the alignment portion 6 of the disc portion 3. The mounting segments may be coupled to the alignment portion 5 using one or more coupling devices such as, but not limited to, a bolt. The mounting segments may be of varying lengths and shapes based on a requirement. For example, the mounting segment 13 is of a curved quadrilateral shape and a quadrilateral shape (mounting segment 14) as illustrated in FIG. 2. In an embodiment, the shape of the mounting segments may be a curved rectangle and a square. Further, the mounting segments may have a degree of curvature θ based on the curvature of the alignment portion. In other embodiments, the mounting segments may have a sinuous structure and a rhomboid structure. Further, the mounting segments may be fabricated to have varying lengths based on the structure of the portion of the wind turbine to be mounted on the main shaft 1. For example, the mounting segments may include a first mounting segment 13 having a length L1 and a second mounting segment 14 having a length L2. In an embodiment, the length L1 of the mounting segment 13 is greater than the length L2 of the mounting segment 14. In FIG. 2, it may be observed that the mounting segments are coupled to the alignment portion 5 using fastening devices 16. In an embodiment, the fastening device 16 may include a bolt. It may be apparent to a person skilled in the art that the mounting segments may be coupled to the alignment portion 5 using other fastening devices well known in the art.

Figure 3:
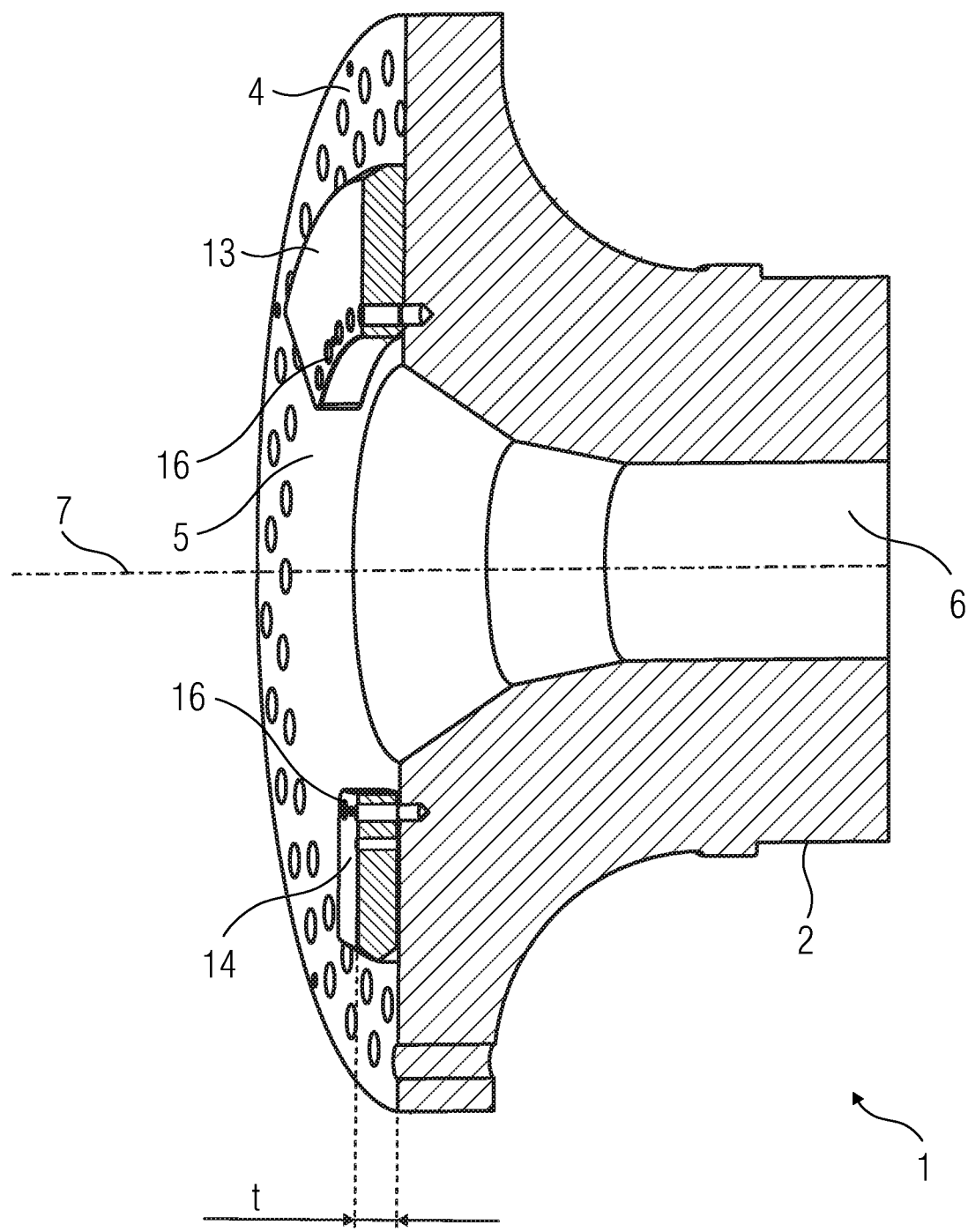
FIG. 3 illustrates a cross sectional view of the main shaft with mounting segments of the wind turbine, in accordance with an embodiment.

FIG. 3 illustrates a cross sectional view of the main shaft 1 with mounting segments of the wind turbine, in accordance with an embodiment. The cross-sectional view of the main shaft 1 reveals the cross section of the mounting segments. The mounting segments have a thickness 't' for aligning a portion of the wind turbine to the central axis 7 of the main shaft 1. In some embodiments, the thickness t may be varied based on a type of a component being mounted to the main shaft 1. In a further embodiment, each mounting segment of the one or more mounting segments may have different thickness t. The cross section also shows that the mounting segments are coupled to the alignment portion 5 using a bolted fastening device 16. However, the mounting segments may be fastened to the alignment portion using other fastening devices known in the art.

Figure 4:
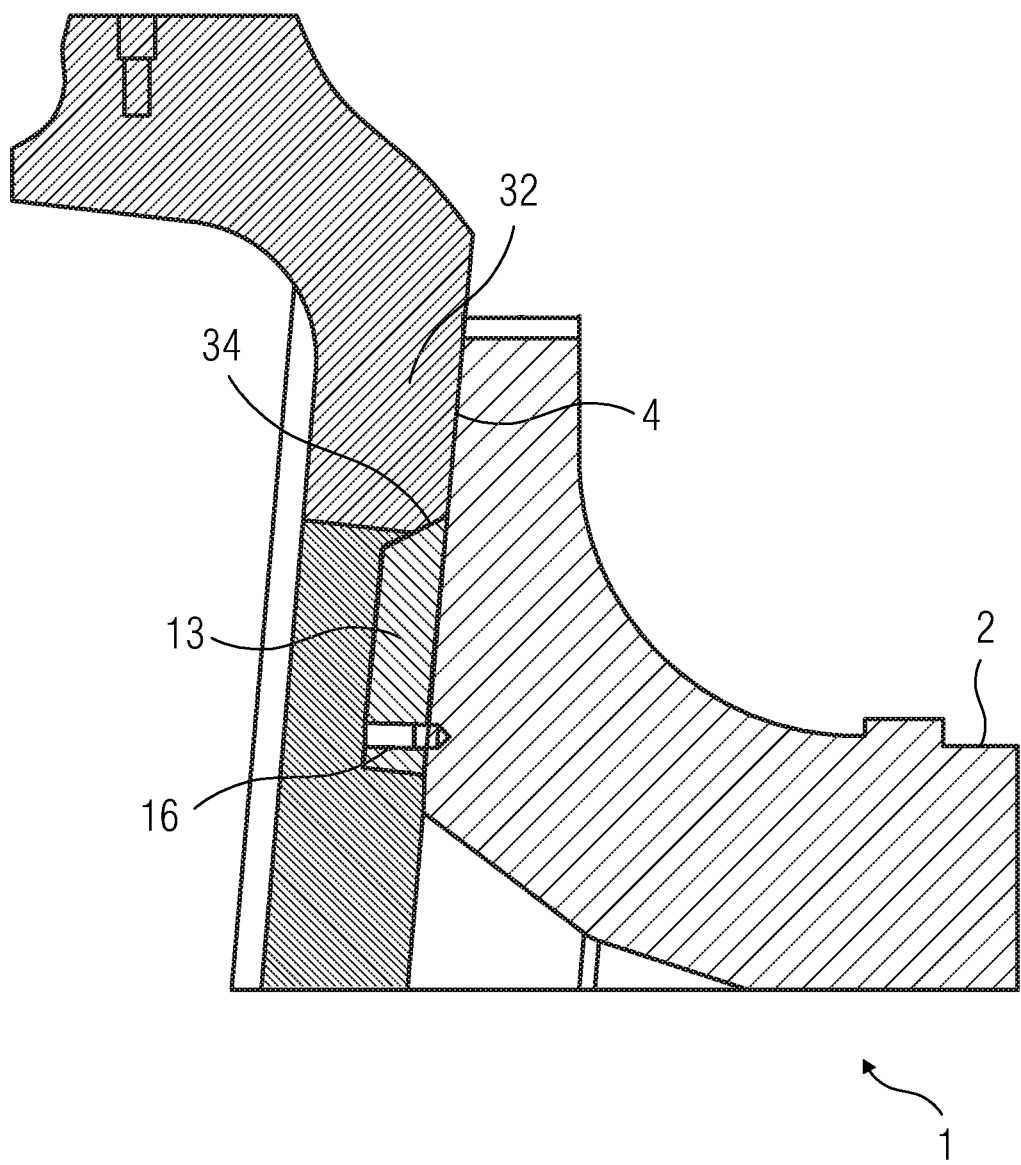
FIG. 4 illustrates a cross sectional view of the main shaft with mounting segments when a component of the wind turbine is mounted onto the main shaft, in accordance with an embodiment.

FIG. 4 illustrates a cross sectional view of the main shaft with mounting segments when a component 32 of the wind turbine is mounted onto the main shaft 1, in accordance with an embodiment. As illustrated in FIG. 4, the component 32 of the wind turbine is coupled to the coupling portion of the main shaft 1. The component 32 of the wind turbine makes a positive contact with the coupling portion 4. In an embodiment, the component 32 of the wind turbine is a hub portion of the wind turbine. As illustrated in FIG. 4, the top edge 34 of the mounting segment 13 is tapered for reducing the stress concentration at the mounting segments.

Figure 5:
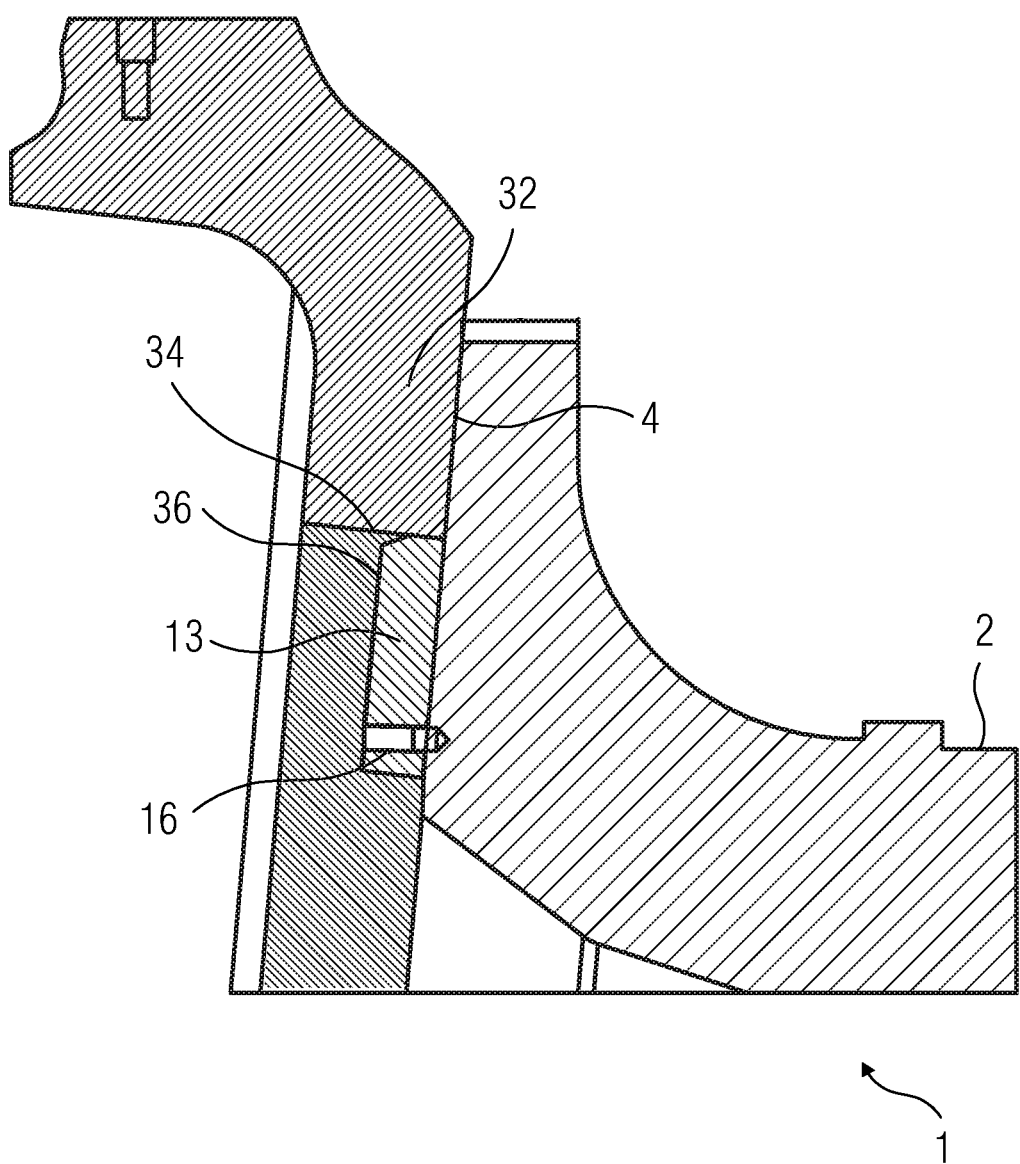
FIG. 5 illustrates a cross sectional view of another variant of the main shaft with mounting segments when a component of the wind turbine is mounted onto the main shaft, in accordance with an embodiment.

FIG. 5 illustrates a cross sectional view of another variant of the main shaft with mounting segments with a component of the wind turbine mounted onto the main shaft, in accordance with an embodiment. In this embodiment, the top edge 36 is not tapered. The component 32 makes a positive contact with the top edge 34 of the mounting segment 13. The top edge 34 is not tapered in this embodiment.

Figure 6:
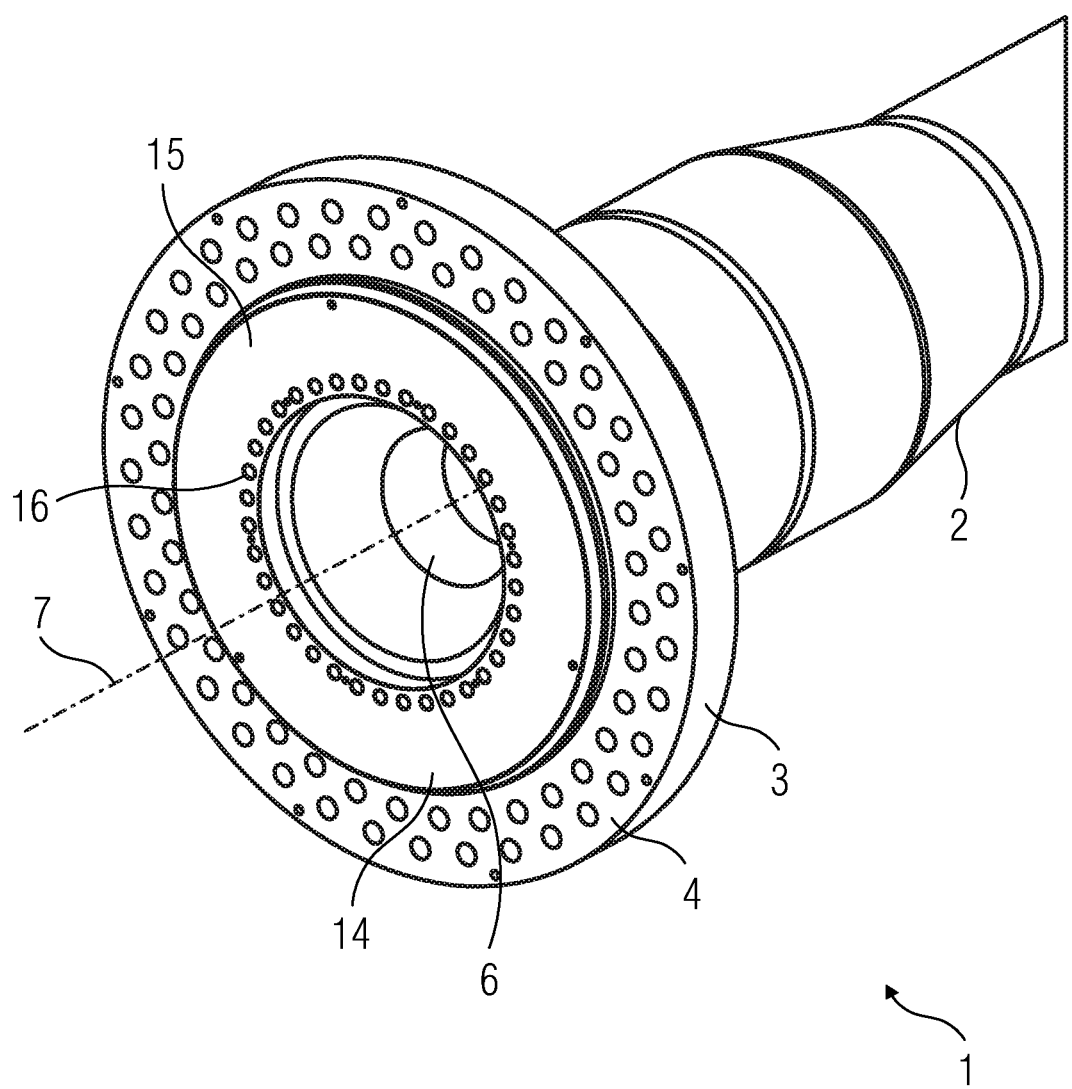
FIG. 6 illustrates a perspective view of an arrangement of mounting segments on the alignment portion of the main shaft, in accordance with an embodiment.

FIG. 6 illustrates a perspective view of an arrangement of mounting segment 15 on the alignment portion 5 of the main shaft 1, in accordance with an embodiment. The mounting segment 15 is a single piece coupled to the alignment portion 5. This arrangement results in increase stability and durability of the main shaft 1. Similar to the mounting segments 13 and 14, the mounting segment 15 also has a thickness t, which is chosen based on the component of the wind turbine coupled to the coupling portion 4.

Figure 7:
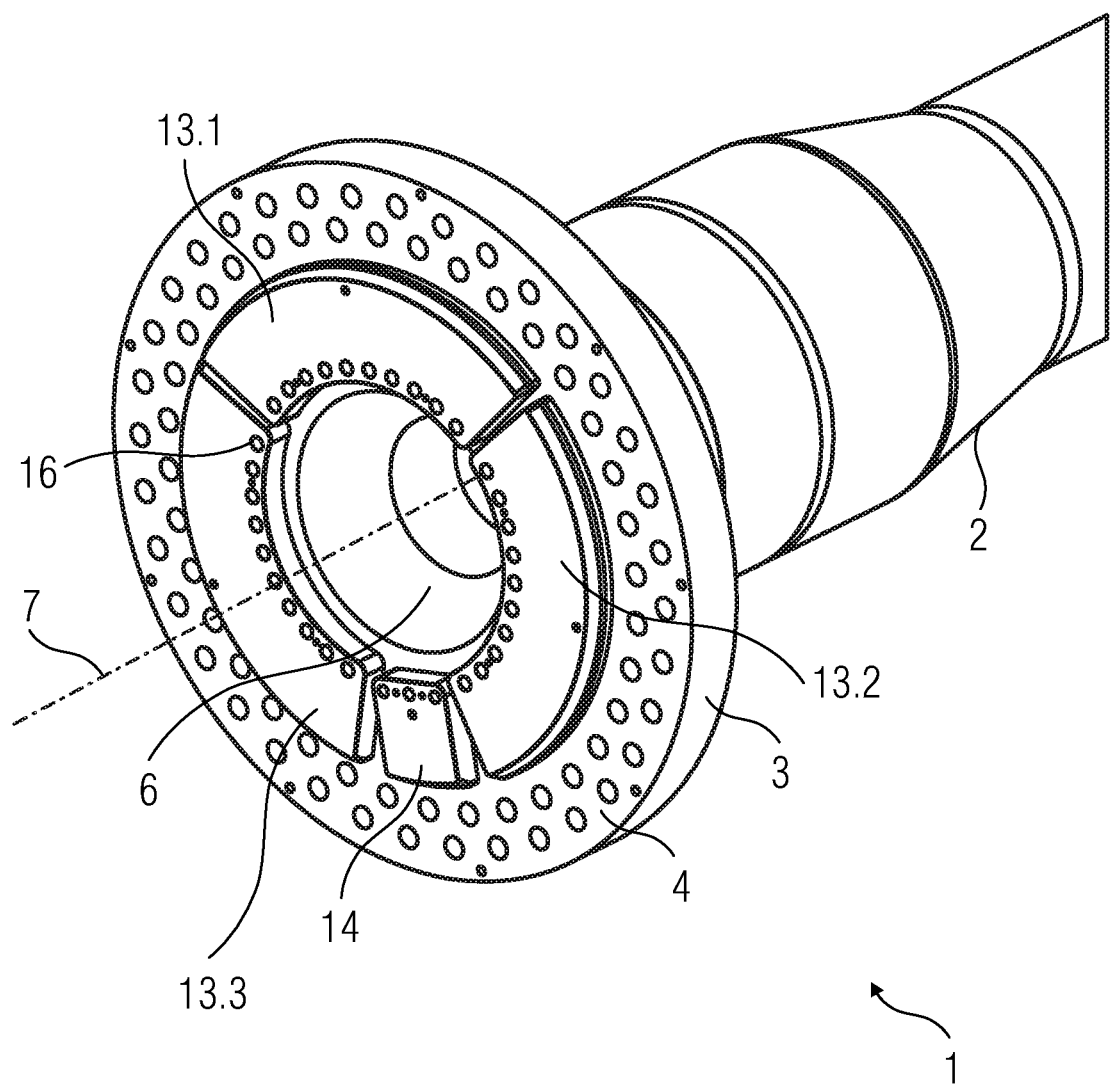
FIG. 7 illustrates a perspective view of another arrangement of mounting segments on the alignment portion of the main shaft, in accordance with an embodiment.
Figure 8:
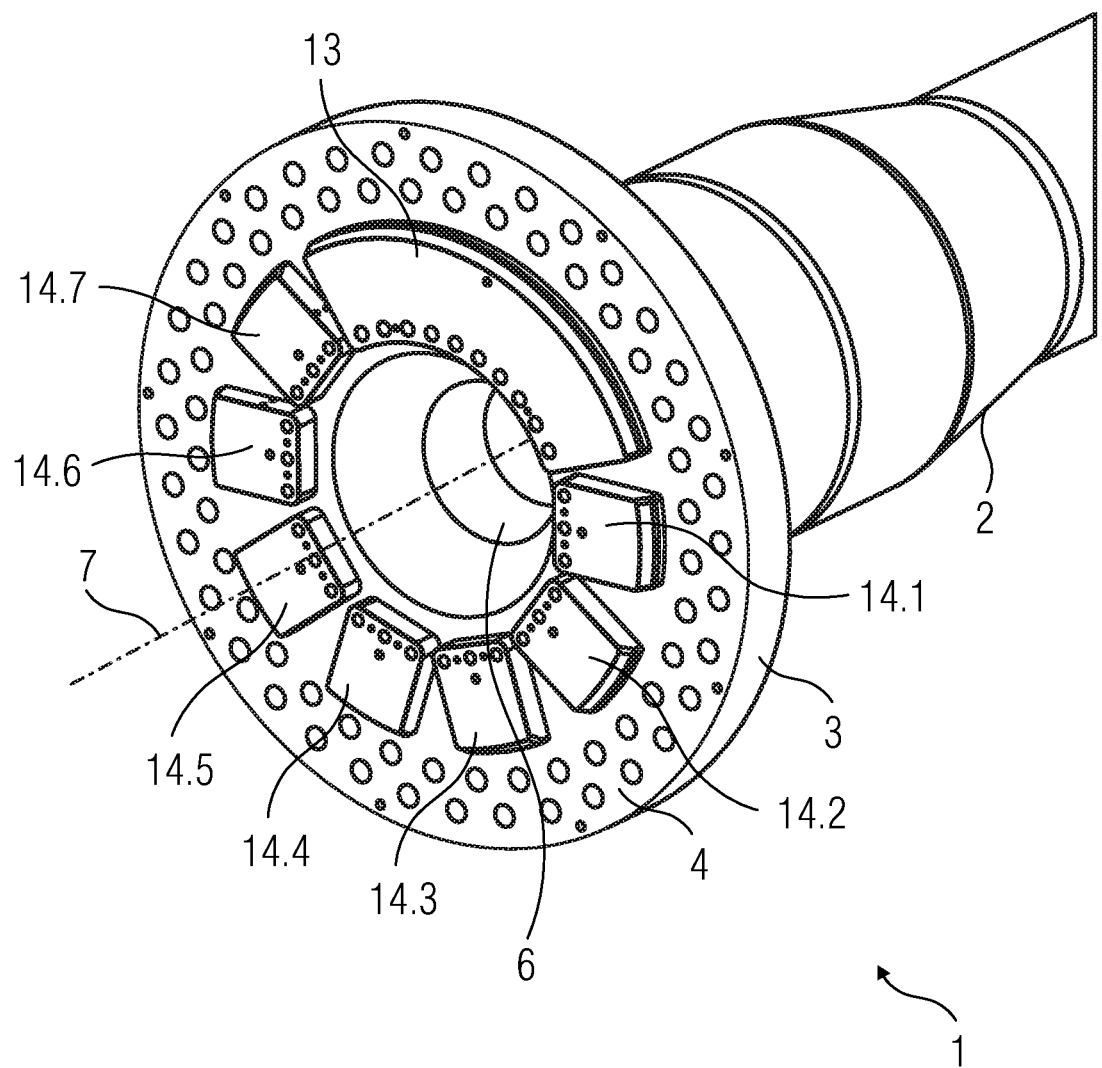
FIG. 8 illustrates a perspective view of yet another arrangement of mounting segments on the alignment portion of the main shaft, in accordance with an embodiment.

FIG. 7 illustrates a perspective view of an arrangement of mounting segments 13,14 on the alignment portion 5 of the main shaft 1, in accordance with an embodiment. In the embodiment depicted in FIG. 7, there are three units of mounting segment 13.1, 13.2 and 13.3 and one unit of mounting segment 14 coupled to the alignment portion. FIG. 8 illustrates a perspective view of another arrangement of mounting segments on the disc portion of the main shaft, in accordance with an embodiment. In the exemplary embodiment depicted in FIG. 8, seven units of mounting segment 14 (14.1-14.7) and a single unit of mounting segment 13 is used for aligning the component of the wind turbine to the central axis 7 of the main shaft 1. Similarly, various types of mounting segments may be used to align the portion of the wind turbine to the central axis 7 of the main shaft 1. Further, various combinations of the mounting segments 13 and 14 may be employed to align the components of the wind turbine coupled to the main shaft 1.

The advantageous embodiments of the mounting segments disclosed herein result in an economical construction of the main shaft 1. The material used for fabricating the mounting segments may be much cheaper than the material used to fabricate the main shaft 1. Further, the weight of the main shaft 1 is reduced as the nose portion 5 is eliminated from the construction of the main shaft 1. Further, the mounting segments may be fixed to certain portion of the alignment segment 5 of the main shaft 1. Thus, there is a reduction in costs incurred. Further, in the prior art embodiment depicted in FIG. 1, there may be areas of stress concentration near the rounded edges of the nose portion 5. Alternatively, in the advantageous embodiment disclosed herein, the tapered edge of the mounting segments results in lesser stress concentration near the mounting segment.

While the present disclosure has been described in detail with reference to certain embodiments, it should be appreciated that the present disclosure is not limited to those embodiments. In view of the present disclosure, many modifications and variations would be present themselves, to those skilled in the art without departing from the scope of the various embodiments, as described herein. The scope of the present disclosure is, therefore, indicated by the following claims rather than by the foregoing description. All changes, modifications, and variations coming within the meaning and range of equivalency of the claims are to be considered within their scope.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A main shaft of a wind turbine, the main shaft comprising:
   an axially-extending shaft portion;
   a disc portion radially-extending from an end of the shaft portion, the disc portion having an outer face comprising:
   a coupling portion provided at an outermost radial portion of the disc portion, the coupling portion comprising a plurality of mounting features configured to receive fastening devices for coupling a component of the wind turbine thereto,
   a hollow portion provided at an innermost radial portion of the disc portion that is aligned with a central axis of the main shaft, and
   an alignment portion positioned radially between the coupling portion and the hollow portion; and
   one or more mounting segments coupled to a surface of the alignment portion of the disc portion, each mounting segment coupled to the alignment portion with at least one fastening device;
   wherein each mounting segment of the one or more mounting segments has a tapered edge positioned on an outer radial edge of the mounting segment closer to the coupling portion of the disc portion than the hollow portion of the disc portion, and
   wherein the tapered edge of the mounting segment is configured to provide a guide for the component of the wind turbine being attached to the coupling portion of the disc portion to align the component of the wind turbine with the central axis of the main shaft, and at least a portion of each mounting segment is configured to make positive contact with the component of the wind turbine.

2. The main shaft of claim 1, wherein each mounting segment of the one or more mounting segments has a thickness as measured in a direction extending from the surface of the alignment portion, wherein the thickness is constant for each mounting segment.

3. The main shaft of claim 1, wherein each mounting segment of the one or more mounting segments has a thickness as measured in a direction extending from the surface of the alignment portion, wherein the thickness varies for each mounting segment.

4. The main shaft of claim 1, wherein a mounting segment of the one or more mounting segments has a curved quadrilateral structure, and
   wherein the mounting segment of the one or more mounting segments has a degree of curvature $\theta$.

5. The main shaft of claim 1, wherein the one or more mounting segments comprises a first mounting segment and a second mounting segment, wherein a length of the first mounting segment is greater than a length of the second mounting segment.

6. The main shaft of claim 5, wherein the first mounting segment and the second mounting segment are placed diagonally opposite to each other.

7. The main shaft of claim 1, wherein each mounting segment of the one or more mounting segments has a thickness as measured in a direction extending from the surface of the alignment portion, and wherein the thickness is configured to align the component of the wind turbine with the central axis of the main shaft.

8. The main shaft of claim 1, wherein the one or more mounting segments comprises structural steel.

9. The main shaft of claim 1, wherein the coupling portion of the disc portion is configured to receive a hub portion of the wind turbine and the tapered edge of a mounting segment of the one or more mounting segments is configured to provide a guide for the hub portion of the wind turbine being attached to the coupling portion of the disc portion to align with the central axis of the main shaft.

10. The main shaft of claim 1, wherein the plurality of mounting features of the coupling portion comprises a plurality of threaded portions configured to receive bolts to secure the component of the wind turbine onto the coupling portion.

11. The main shaft of claim 1, wherein the at least one fastening device coupling the one or more mounting segments to the alignment portion comprise a bolt, a weld, an adhesive, or a combination thereof.

12. A wind turbine comprising:
a component of the wind turbine; and
a main shaft having:
an axially-extending shaft portion;
a disc portion radially-extending from an end of the shaft portion, the disc portion having a radially-extending outer face comprising:
a coupling portion provided at an outermost radial portion of the disc portion, the coupling portion comprising a plurality of mounting features configured to receive fastening devices for coupling the component of the wind turbine thereto,
a hollow portion provided at an innermost radial portion of the disc portion that is aligned with a central axis of the main shaft, and
an alignment portion positioned radially between the coupling portion and the hollow portion; and
one or more mounting segments coupled to a surface of the alignment portion of the disc portion, each mounting segment coupled to the alignment portion with at least one fastening device;
wherein each mounting segment of the one or more mounting segments has a tapered edge positioned on an outer radial edge of the mounting segment closer to the coupling portion of the disc portion than the hollow portion of the disc portion, and
wherein the tapered edge of the mounting segment is configured to provide a guide for the component of the wind turbine being attached to the coupling portion of the disc portion to align the component of the wind turbine with the central axis of the main shaft, and at least a portion of each mounting segment is configured to make positive contact with the component of the wind turbine.

13. The wind turbine of claim 12, wherein the component of the wind turbine is a hub portion of the wind turbine.

14. The wind turbine of claim 12, wherein the plurality of mounting features of the coupling portion comprises a plurality of threaded portions configured to receive bolts to secure the component of the wind turbine onto the coupling portion.

15. The wind turbine of claim 12, wherein the at least one fastening device coupling the one or more mounting segments to the alignment portion comprise a bolt, a weld, an adhesive, or a combination thereof.

* * * * *